US009009730B2

(12) United States Patent
Edwards et al.

(10) Patent No.: US 9,009,730 B2
(45) Date of Patent: Apr. 14, 2015

(54) TRANSACTION CAPABLE QUEUING (71) Applicant: International Business Machines Corporation, Armonk, NY (US)

(72) Inventors: Ian C. Edwards, Hursley (GB); Jonathan Levell, Hursley (GB); Trevor Lobban, Hursley (GB); Andrew J. Schofield, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/168,743

(22) Filed: Jan. 30, 2014

(65) Prior Publication Data

US 2014/0289744 A1 Sep. 25, 2014

(30) Foreign Application Priority Data

Mar. 20, 2013 (GB) .................... 1305062.0

(51) Int. Cl.
G06F 13/00 (2006.01)
G06F 9/54 (2006.01)
G06F 9/52 (2006.01)

(52) U.S. Cl.
CPC . G06F 9/546 (2013.01); G06F 9/52 (2013.01)

(58) Field of Classification Search
CPC ...................................................... G06F 9/546
USPC .......................................................... 719/314
See application file for complete search history.

(56) References Cited

U.S. PATENT DOCUMENTS

| 6,012,094 | A | 1/2000 | Leymann et al. |
|---|---|---|---|
| 6,247,025 | B1 | 6/2001 | Bacon |
| 6,314,563 | B1 | 11/2001 | Agesen et al. |
| 6,636,883 | B1 | 10/2003 | Zebrowski |
| 6,665,814 | B2 | 12/2003 | Hobson et al. |
| 6,735,760 | B1 | 5/2004 | Dice |
| 7,035,852 | B2 * | 4/2006 | Hopewell et al. ...... 707/999.008 |
| 7,293,143 | B1 | 11/2007 | Shavit et al. |
| 7,509,463 | B2 | 3/2009 | Marr et al. |
| 7,757,119 | B2 | 7/2010 | Hickson |

(Continued)

FOREIGN PATENT DOCUMENTS

EP 0466339 1/1992

OTHER PUBLICATIONS

Hohmuth et al, "Pragmatic nonblocking synchronization for real-time systems," Proceedings of the 2001 USENIX Annual Technical Conference (USENIX '01), Jun. 2001, 15 pages.

Ladan-Mozes et al., "An Optimistic Approach to Lock-Free FIFO Queues," Distributed Computing: 18th International Conference (DISC 2004), Oct. 2004, pp. 117-131.

(Continued)

*Primary Examiner* — Andy Ho
(74) *Attorney, Agent, or Firm* — Yee & Associates, P.C.; Parashos T. Kalaitzis (57) ABSTRACT

Transactional capable queuing is provided. A queue having an ordered list of messages is provided. A get cursor operation is provided within the queue to point to a current starting place for a getting application to start searching for a message to retrieve. A first lock is provided for putting operations, in response to there being more than one putting application, to ensure only one application is putting to the queue at a time. A second lock is provided for getting operations, in response to there being more than one getting application, to ensure that only one application is getting from the queue at a time. Putting applications and getting applications are synchronized to check and update the get cursor operation.

20 Claims, 5 Drawing Sheets

(56) References Cited

U.S. PATENT DOCUMENTS

| | | | |
|---|---|---|---|
| 7,945,631 B2* | 5/2011 | Chkodrov et al. | 709/206 |
| 2002/0116538 A1* | 8/2002 | Chen et al. | 709/314 |
| 2007/0156834 A1* | 7/2007 | Nikolov et al. | 709/207 |
| 2007/0288931 A1* | 12/2007 | Avkarogullari | 719/312 |
| 2011/0145515 A1 | 6/2011 | Serebrin | |

OTHER PUBLICATIONS

Shann et al., "A Practical nonblocking queue algorithm using compare-and swap," Proceedings of the Seventh International Conference on Parallel and Distributed Systems, Jul. 2000, pp. 470-475.
UK Intellectual Property Office Search Report regarding Application No. GB1305062.0, dated Oct. 9, 2013, 3 pages.

* cited by examiner

TRANSACTION CAPABLE QUEUING

This Application is a counterpart of and claims the benefit of priority to United Kingdom Patent Office Application Serial No. GB 1305062.0, filed on Mar. 20, 2013, the contents of which are hereby incorporated by reference.

BACKGROUND

1. Field

This invention relates to the field of queuing in computer systems. In particular, the invention relates to transaction capable queuing.

2. Description of the Related Art

A queue of messages is a widely used concept in computing. In particular, in messaging middleware a queue can be used to buffer messages sent between applications. Often the performance of these queues is critical to the performance of the system as a whole; therefore much research has gone into creating efficient implementations.

If the system calls for a strictly FIFO (First-In-First-Out) queue, there are a large number of ways of writing a lock-free/wait-free queue that will scale to a large number of applications simultaneously putting and getting messages from such a queue. The drawback of such designs is that they tend to be complex and slower than a simpler queue in the case where there is a single application putting and a single application getting messages from the queue. Such algorithms usually rely on the ability to perform atomic operations like compare-and-swap (CAS) (discussed later). These atomic operations are usually a single machine instruction and are not considered a lock in the conventional sense.

Often a strictly FIFO queue is not sufficient, for example JMS (Java® Message Service) requires that queues support transactions so that messages can be put/got from the queue in two stages. First the message(s) are put/got, then (potentially as a group) the messages are committed or instead all the puts/gets are cancelled, which is known as a rollback. In order to preserve message order (and to simplify the commit operation which should be fast and should NOT fail), implementations of transactions often involve leaving messages involved in a transaction on the queue but in a "locked" state so that they cannot be accessed by other applications. Queues that implement transactions in this fashion are no longer FIFO; the messages at the head/tail of the queue may be locked and the first message available to retrieve may actually be in the middle of the list of messages. Java and all Java-based trademarks and logos are trademarks or registered trademarks of Oracle and/or its affiliates.

As far as is known, no lock-free algorithm exists that works for this type of non-FIFO queue.

A "two-lock" FIFO queue is known which allows an application to be putting to the queue and simultaneously a different application can be getting so that messages can efficiently stream though the queue. If it is possible that multiple applications might need to put (or get) simultaneously, then the right to put (or get) is serialized by a lock (thus the two locks are a put-lock and a get-lock). An explanation of how a two-lock queue may be implemented is provided by Herb Sutter at http://www.ddj.com/cpp/211601363.

In the two-lock FIFO queue, no serialization occurs between the putter and getter—the getter always gets the first message on the queue regardless of what the putter is doing. In the non-FIFO transaction supporting queue mentioned, there can be no such isolation. Getting applications need to efficiently find a message to get and if a putting application commits a message "before" the position in the queue at which the getting application is examining, the getter must find that message instead.

Transactions are supposed to be atomic, which means that if two messages put to the queue are committed in a single transaction, the message that was put first must be got first. This underlines the need for efficient communication between putter and getter. If the getter was just examining messages one by one on the queue, when it finds the first message in the transaction it may still be locked but by the time the second message is examined (if the commit has occurred) then that message may be available and the wrong message may be got from the queue.

Therefore, there is a need in the art to address the aforementioned problems.

SUMMARY

According to a first aspect of the present invention there is provided a method for transactional capable queuing, comprising: providing a queue having an ordered list of messages; providing a get cursor operation within the queue to point to a current starting place for a getting application to start searching for a message to retrieve; providing a first lock for putting operations, if there is more than one putting application, to ensure only one application is putting to the queue at a time; providing a second lock for getting operations, if there is more than one getting application, to ensure that only one application is getting from the queue at a time; and synchronizing between putting and getting applications to check and update the get cursor operation.

The method may include a putting application using an instruction to rewind the cursor if it commits a message earlier than the current position of the cursor. The method may include a getting application using an instruction to move the cursor forward.

The get cursor operation may consist of one or two memory words used by an atomic instruction for synchronizing.

In one embodiment, the queue may be a singly-linked list and the ordered list of messages may be provided by numbering each message on the queue. The get cursor operation may use: a pointer to the message on the queue where the search should start; and the order number of the message on the queue. Synchronizing may use a Double Width Compare and Swap (DWCAS) operation and a get cursor operation consists of two memory words for the pointer and order number of the message.

In another embodiment, the queue may be a data structure with an index acting as both pointer and order number; and the get cursor operation may point to the index of the data structure. Synchronizing may use a Compare and Swap (CAS) operation and a get cursor operation consists of one memory word for the index.

Synchronizing may alternatively use a lock on the get cursor operation.

If there is a single putting application, no first lock may be provided; if there is a single getting application, no second lock may be provided; and in these cases, the synchronizing may be around the get cursor operation.

The method may include providing a dummy message to prevent an empty queue.

The method may also include providing a maximum order number to indicate that there is no valid message for a getting application to retrieve and a new put sets the cursor to point to it.

The first and second locks may lock a message for every queue involved in the transaction for the duration of a commit or rollback.

The first and second locks may be provided by flags set in a message to indicate that the message is available or is part of a transaction. Alternatively, the first and second locks may be provided by a lock manager maintaining a list of messages locked on behalf of a transaction.

According to a second aspect of the present invention there is provided a system for transactional capable queuing, comprising: a queue having an ordered list of messages; a get cursor component for operation within the queue to point to a current starting place for a getting application to start searching for a message to retrieve; a first lock for putting operations, if there is more than one putting application, to ensure only one application is putting to the queue at a time; a second lock for getting operations, if there is more than one getting application, to ensure that only one application is getting from the queue at a time; a synchronizer mechanism for synchronizing between putting and getting applications to check and update the get cursor operation.

A putting application may include an instruction to rewind the cursor if it commits a message earlier than the current position of the cursor. A getting application may include an instruction to move the cursor forward.

The get cursor component may consist of one or two memory words used by an atomic instruction for synchronizing. Alternatively, the get cursor component includes a get cursor lock for synchronizing.

In one embodiment, the queue is a singly-linked list and the ordered list of messages is provided by numbering each message on the queue; and wherein the synchronizing mechanism includes a Double Width Compare and Swap (DWCAS) operation and a get cursor component consists of two memory words for the pointer and order number of the message.

In another embodiment, the queue is a data structure with an index acting as both pointer and order number; and wherein synchronizing uses a Compare and Swap (CAS) operation and a get cursor component uses one memory word for the index.

According to a third aspect of the present invention there is provided a computer program product for transaction capable queuing, the computer program product comprising: a computer readable storage medium readable by a processing circuit and storing instructions for execution by the processing circuit for performing a method according to the first aspect of the present invention.

According to a fourth aspect of the present invention there is provided a computer program stored on a computer readable medium and loadable into the internal memory of a digital computer, comprising software code portions, when said program is run on a computer, for performing the method of the first aspect of the present invention.

According to a fifth aspect of the present invention there is provided a method substantially as described with reference to the figures.

According to a sixth aspect of the present invention there is provided a system substantially as described with reference to the figures.

The described aspects of the invention provide the advantage of enabling transactional capable queuing.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION OF THE DRAWINGS

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method, system, and computer program product are provided for implementing a two-lock queue that supports transactions. It requires some synchronization between the putter and getter and this may be efficiently achieved using Compare-And-Swap (CAS) or Double-Width-Compare-And-Swap (DWCAS), or alternatively, another lock. CAS is an atomic instruction used in multithreading to achieve synchronization. It compares the contents of a memory location to a given value and, only if they are the same, modifies the contents of that memory location to a given new value. DWCAS is a common technique that allows two adjacent memory words to be updated to new values if the existing values in those locations are as the program expects. This means that communication between the putter and the getter can be implemented by a small number of invocations of this single instruction.

Figure 1:
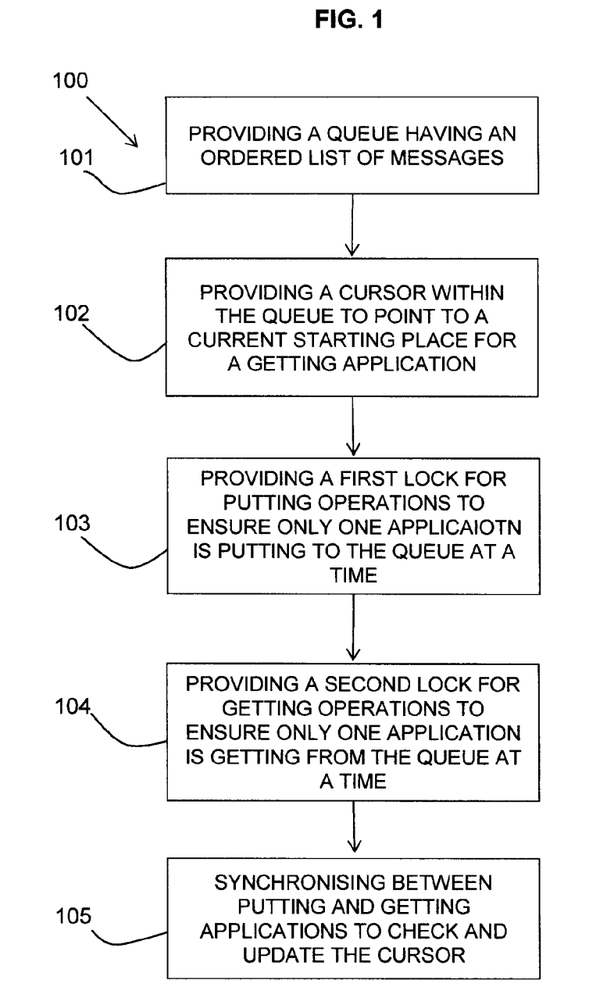
FIG. 1 is a flow diagram of an example embodiment of a method, in accordance with a preferred embodiment of the present invention.

Referring to FIG. 1, a flow diagram 100 shows an example embodiment of the described method. A queue may be provided 101 having an ordered list of messages. For example, the queue may be a singly-linked list of the ordered list of messages may be provided by the numbering of each them on the queue. In another example, the queue may be a data structure with an index acting as an order number.

A cursor may be provided 102 within the queue to point to a current starting place for a getting application. The cursor may include a pointer to a message on the queue and the order number of the message on the queue, or may point to an index of a data structure.

A first lock may be provided 103 for putting operations to ensure only one application is putting to the queue at a time. A second lock may be provided 104 for getting operations to ensure only one application is getting from the queue at a time.

If there is only a single putting application, no putting lock is required (so the queue might just have a single getting lock). If there is only a single getting application, no get lock is required so the queue can have no lock or a putting lock and/or a getting lock depending how it is being used.

Synchronizing may be provided 105 between putting and getting applications to check and update the get cursor operation. The synchronizing may be carried out by an atomic operation such as CAS or DWCAS or by a lock on the cursor as explained in more detail below.

Figure 2:
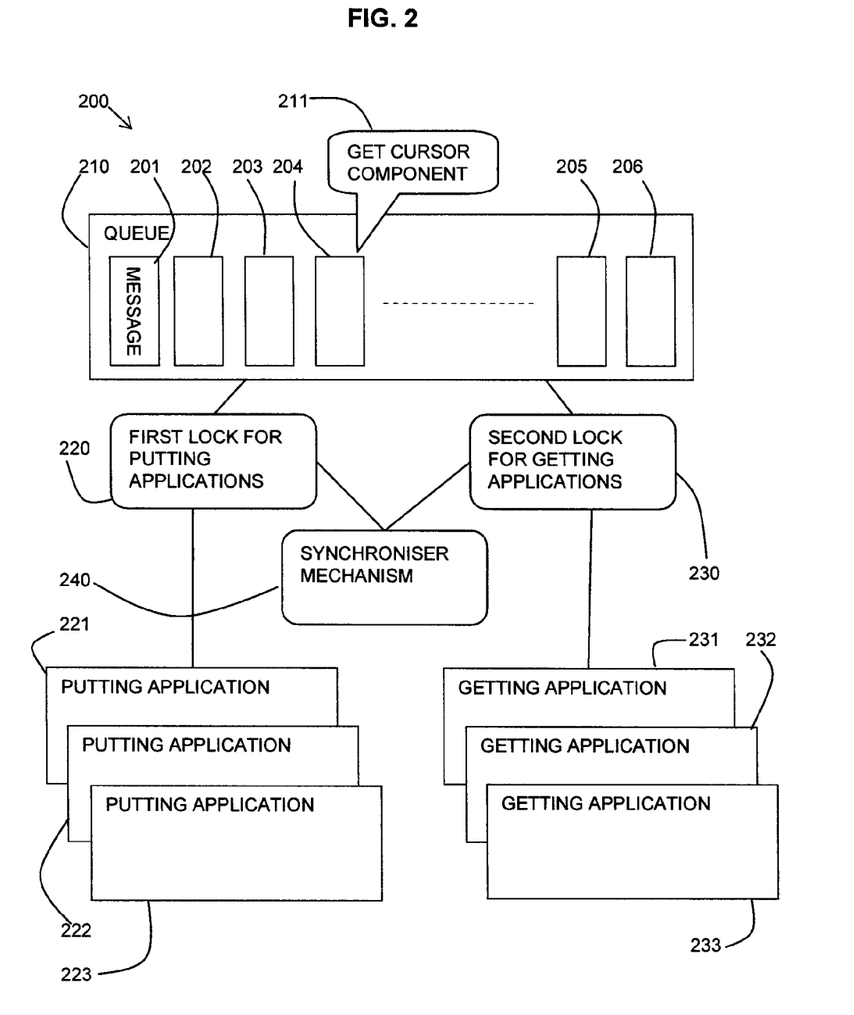
FIG. 2 is a block diagram of an example embodiment of a system, in accordance with a preferred embodiment of the present invention.

Referring to FIG. 2, a schematic block diagram 200 shows an example of the described system.

A queue 210 may be provided which supports transactional processing. The queue 210 may have messages 201, 202, 203, 204, 205, and 206 in the queue 210 which are ordered. In one embodiment, this may be an "orderId" of a message as it is put on the queue (for example, starting at 1 and sequentially increasing), so that a lower number corresponds to a message that was put earlier.

The queue 210 may include a pointer to the head of the queue which will have the oldest messages still on the queue and a pointer to the tail of the queue which will have the most recently added message.

A get cursor component 211 is provided that corresponds to a place in the queue that a getting application should start to search for a message to retrieve. A cursor may point to a message 204 in the queue 210 marking a current starting place for a getting application to start searching for a message to retrieve. In one embodiment, the get cursor component 211 may use two memory words—one a pointer to the message on the queue where the search should start and the other word containing the orderId of the message.

One or more putting applications 221, 222, 223 may put to the queue 210 and one or more getting applications 231, 232, 233 may get from the queue 210.

A first lock 220 may be provided for putting applications to ensure that only one application is putting to the queue at a time. A second lock 230 may be provided for getting applications to ensure that only one application is getting from the queue at a time. If there is only a single putting application, no first lock 220 may be required (so the queue might just have a single getting lock). If there is only a single getting application, no second lock 230 may be required so the queue can have no lock or a putting lock and/or a getting lock depending how it is being used.

A synchronizer mechanism 240 may be provided for synchronizing between putting applications 221-223 and getting applications 231-233 to check and update the get cursor component 211. The synchronizer mechanism 240 may use an atomic operation, such as a CAS or DWCAS, for communication between the putting and getting applications. Alternatively, a cursor lock may be used.

Figure 3:
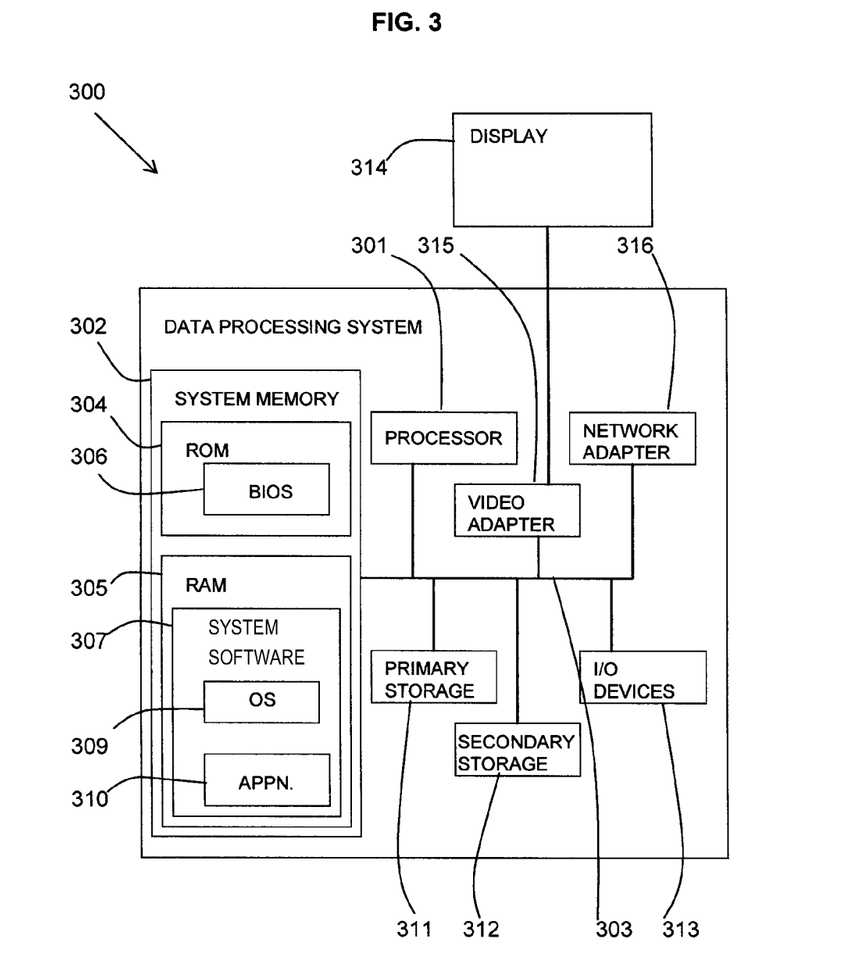
FIG. 3 is a block diagram of an embodiment of a computer system, in accordance with the prior art, and in which a preferred embodiment of the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements may include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 309. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary storage means 311 and secondary storage means 312, as well as the system memory 302.

The computing system 300 may operate in a networked environment using logical connections to one or more remote computers via a network adapter 316.

Input/output devices 313 may be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Further details of implementations of the described method for a transactional capable queue are now described. The method includes providing a queue, wherein the queue may comprise a "get cursor" mechanism corresponding to a starting place for "getting applications" to start searching for a message to retrieve. A first lock may be provided for putting and a second lock may be provided for getting.

In a first embodiment, the queue can be built from messages that are not contiguous in memory. This may be envisaged as a singly-linked list where each message contains a pointer to the subsequent message, but the under-lying data-structure may be more complicated, for example, messages could be grouped into "pages" and each page of messages could have a pointer to the next page. Numbering may be carried out of each message (=orderId) on the queue wherein a lower number corresponds to a message that was put earlier.

In this embodiment, synchronizing (communicating) between the first and second locks may use a Double-Width-Compare-And-Swap (DWCAS) operation. A putting application may use a DWCAS instruction to rewind the cursor if it commits a message earlier than the cursor. A getting application may use a DWCAS instruction to move the cursor forward.

In this embodiment, the get cursor comprises: a pointer to the message on the queue where the search should start; and the "orderId" of the message.

In a second embodiment, the queue may also be used for a data structure such as an array where the index in the array can act as both "pointer" to the message and its ordered, but in that case a. CAS rather than DWCAS would be used.

No details are provided of how to add/remove messages from the list as this is known in the art—in the singly-linked list example these are trivial operations.

It is common for processors to use 64-bit words. This means that an "orderId" consisting of a single word would allow nearly $2^{64}=1.8 \times 10^{19}$ messages ("nearly $2^{64}$" as at least 1 "orderId" will be reserved as a special value). If 1 million messages are added to the queue every second then it would take more than 500,000 years for the "orderId" to wrap. This means that unless such a queue was used at an incredibly high messaging rate it is not possible for the "orderId" to wrap in practice. If it does need to be considered, as the "orderId" is known for head and tail messages, then it is possible to detect such a wrapping and the code to decide whether an "orderId" was "earlier" than another could be enhanced to account for this. However, as it is such an infrequent event it would almost certainly be better to keep the normal code simple/efficient and deal with the wrapping as a special case and temporarily disable the queue and renumber everything.

Dealing with an empty queue can be slightly complex in a two-lock queue. One solution of how to address this is to never have an empty queue. On queue creation, a dummy node may be created and the head+tail+getCursor may all point to it. If the getter thinks it may be removing the last node, it does not remove it and instead marks it as a dummy and the dummy is removed later when the head is advanced again.

A maximum value for the "orderId" (henceforth OrderId_Max) may be used to indicate that the getCursor points "past the tail of the queue" (i.e. there is no valid message for the getter to retrieve) so that a new put will set the cursor to point to it.

A description is now provided of how various operations are performed on the queue. In this description, it is assumed that each message contains a flag that denotes whether the message is available or is currently part of a transaction. This is sufficient for a completely atomic transaction, messages will become available one at a time, no messages can be retrieved in an order that shows the commit was not atomic, but there are still problems. For example, consider a transaction containing two puts, for a truly atomic transaction, the messages should be available simultaneously, but with the scheme as described, a user can tell this is not the case. Imagine three gets from the queue in very quick succession, the first get might get the first message put, but the second get might occur before the second message put in the transaction is marked available (and the message would finally be retrieved by the 3rd get). For a truly atomic transaction the second get in the example should not fail. Once the operations have been described with this limitation, solutions will be discussed that can address this limitation.

On many modern systems, memory barriers may be required in order to ensure that operations appear (to other parts of the system) to happen in the correct order. These barriers are not described as they will vary depending on the architecture, a programmer skilled in the art will be able to infer where the barriers are needed on architectures they are familiar with.

Figure 4:
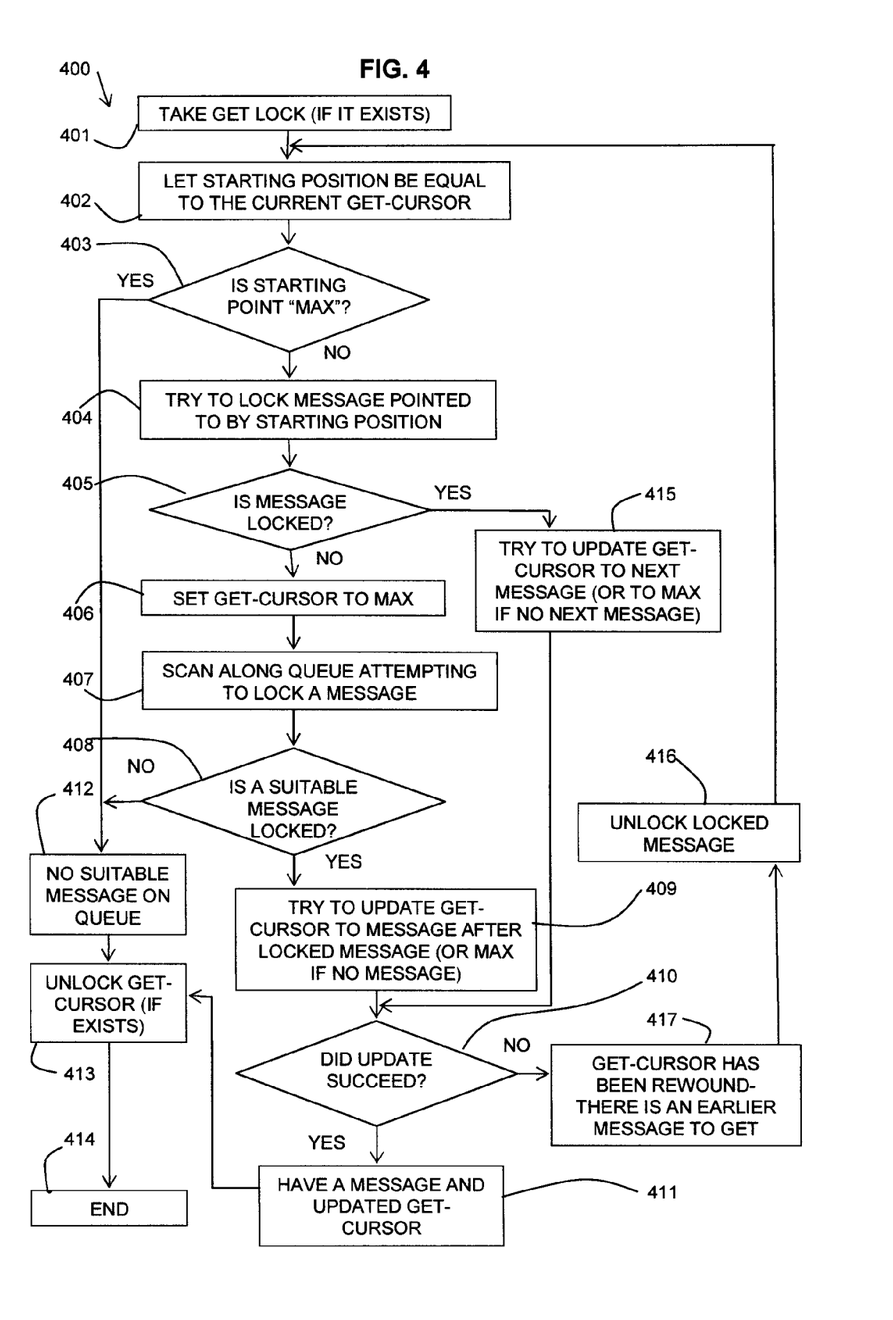
FIG. 4 is a flow diagram of an example embodiment of an aspect of a method, in accordance with a preferred embodiment of the present invention.

Referring to FIG. 4, a flow diagram 400 shows an example embodiment of the operation of getting from the queue.

The method may start by taking 401 the get lock, if it exists. If only one application ever gets from the queue, no getting lock is required. The getting lock is only required if two applications might try and get from the same queue at overlapping times.

The current value of the getCursor may be recorded 402 as "startingpos".

It may be determined 403 if the starting point is "OrderID_Max", in which case, there is no suitable message 412 on the queue, the getCursor may be unlocked 413 (if it exists), and the process may end 414. "OrderID_Max" is the largest possible value for the OrderId part of the getCursor—it never indicates a valid position of a message, all valid messages are considered to be "before" it.

However, if the starting point is not "OrderID_Max", then the message referred to by the "startingpos" is considered, so that the method tries to lock 404 the message.

It may be determined 405, if the message is locked. If it is not locked, the getCursor may be set 406 to "OrderID_Max" and the process may scan 407 along the queue attempting to lock a message. It may be determined 408, if a suitable message is locked. If so, it is attempted 409 to update the getCursor to the message after the locked message, or the "OrderID_Max", if there is no next message.

It may be determined 410, if the update succeeded. If it did succeed, the process has a message and updated getCursor 411. The getCursor may be unlocked 413 (if it exists), and the process may end 414.

Going back to step 405, if the message is locked, the process may try to update 415 getCursor to the next message, or the "OrderID_Max", if there is no next message. The process may then proceed to step 410 and continue as described above.

At step 410, if the update did not succeed, the getCursor may have been rewound 417 as there is an earlier message to get. The locked message may be unlocked 416 and the process may loop back to let the starting position equal the current getCursor 402.

The process of FIG. 4 refers to "locking" a message, this may refer to something as simple as seeing if a flag in the message is set to indicate that the message is in use (i.e. currently being put to or got from the queue) and if the flag is unset, setting it. It may also refer to locking the message by a lock manager as described further below.

Towards the end of the process at step 409, the process attempts to update the getCursor and branch on whether it succeeded. The code may make the update if the orderId of the message that has been locked is less than (or equal to) the getCursor's current orderId. If the getCursor's orderId is less than the message that has been locked, then the update should not change the getCursor and the update is deemed to have been unsuccessful. The check and update is the part of the algorithm that may be performed by a DWCAS operation.

It is possible to do the update without using DWCAS (e.g. because the processor does not support it) by having an extra "get cursor lock" that protects updates to the getCursor. Both getting and putting applications would need to take the lock and the lock-contention may slow down the operation of the queue.

The operation of committing a get may be performed as follows.

All the messages may already be marked unavailable, so either the messages are sequentially marked as deleted (and occasionally garbage collect all deleted messages) or they are removed from the list. Depending on the data structure for the list, this may require the get lock, but it should be noted that if there are messages at the start of the queue which are all suitable for removal and the getCursor is not pointing at them, then the getter will never look at these messages (the cursor cannot be rewound into them) so for a singly-linked list structure, they can be removed without the get lock.

The operation for rolling back a get may be performed as follows.

For each message got in the transaction, in order of increasing orderId:

Mark message available.

If getCursor is after the messages position, rewind the getCursor with synchronization, for example using DWCAS.

Figure 5:
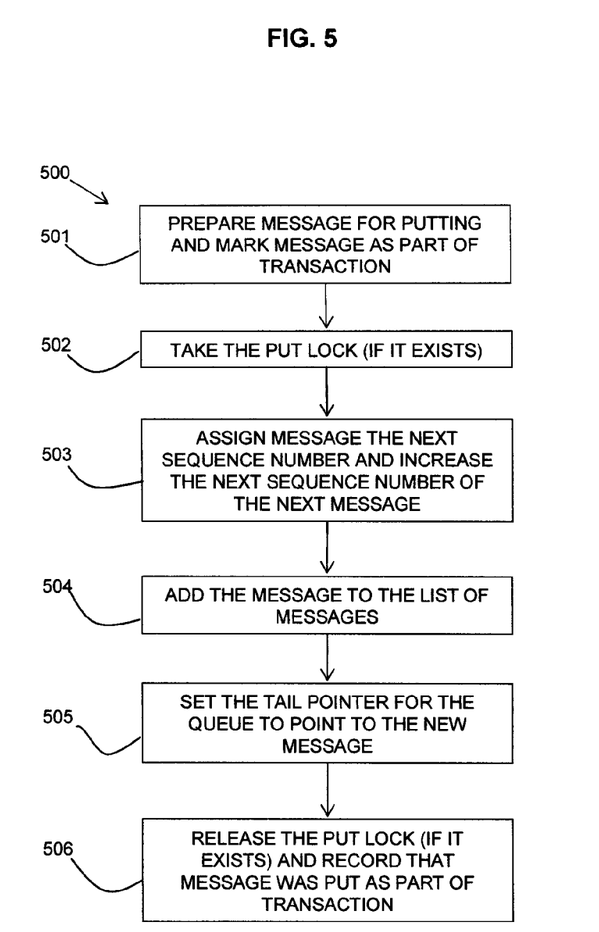
FIG. 5 is a flow diagram of an example embodiment of an aspect of a method, in accordance with a preferred embodiment of the present invention.

Referring to FIG. 5, a flow diagram 500 shows an example embodiment of the operation of putting a message to the queue.

The message may be prepared 501 for putting (for example, allocating any memory necessary for it/copying the message if the copy provided by the putter cannot be used, etc.), and the message may be marked as part of a transaction at this stage.

The put lock may be taken 502, if it exists.

The message may be assigned 503 the nextOrderId sequence number and the nextOrderId may be increased for the next message.

The message may be added 504 to the list of messages. In the embodiment of a singly-linked list, this means setting the "next" pointer of the message at the tail of the list to point to the new message.

The tail pointer for the queue may be set 505 to point to the new message.

The put lock (if it exists) may be released 506 and it may be recorded that this message was put as part of the transaction for use in commit/rollback.

The operation for committing a put may be performed as follows.

For each message put in the transaction, in order of increasing orderId (i.e. the order the messages were put in):

Mark message as available.

If getCursor is after the messages position, rewind the getCursor with a DWCAS.

The operation for rolling back a put may be performed as follows.

All the messages may already be marked unavailable, so either sequentially mark them deleted (and occasionally garbage collect all deleted messages) or remove them from the list. Removing them from the list, depending on the data structure for the list, may require the get lock. However, it should be noted that if there are messages at the start of the queue which are all suitable for removal and the getCursor is not pointing at them, then the getter will never look at these messages (the cursor cannot be rewound into them) so for a singly linked list structure, they can be removed without the get lock.

Note the symmetry between rolling back/committing a put and committing/rolling back a get. Transactions may contain both puts and gets, and the appropriate action described above should be performed for each operation in the transaction. Similarly, the system may contain many queues (and other operations not related to these queues) and the appropriate commit/rollback action should be applied to the relevant queue for each queue related operation.

As mentioned earlier, repeated gets can show the above scheme does not implement atomic transactions. Using rapid, repeated get operations it may be possible to tell that puts to the queue done in a transaction are not added atomically if the method just sequentially sets the flag on each message put saying it is available. The simplest way to make the queue appear atomic is therefore to take the get lock whilst the commit/rollback of the puts is occurring (i.e. whilst the flag in each message is being set to available one after the other). If the application committing the puts has the get lock, this precludes any other application from doing the rapid repeated gets that would show the messages did not all appear simultaneously.

It has a performance impact because all gets are paused whilst puts are committed. Also, if two transactions are committed simultaneously and they both try to take the get locks in all the queues involved, then unless the get locks are taken in the same order both committers could end up holding locks the other is waiting for and wait for each other forever—a deadlock. An order to take the locks on the queues may be defined in order to prevent such deadlocks.

A more sophisticated solution to make the transactions appear atomic is to have a method of allowing the state of multiple messages to appear to change instantaneously from the point of view of the rest of the system. Such a system is described as a "lockmanager".

The lockmanager maintains a list of messages locked on behalf of each transaction in the system. It also maintains (a potentially very large) hash table of all messages currently locked. It has Application Programming Interfaces (APIs) for locking/unlocking a message on behalf of a transaction and querying whether a message is locked, for example, a lookup in the hash table. The key for the hash table may be the orderId of the message (plus a unique id for the queue if there are multiple queues). So an application trying to get a message, instead of looking at an "available" flag in the message, asks the lock manager to lock the message on its behalf. When a transaction needs to be committed the following steps occur:

1. The committer informs the lockmanager of the start of the commit (or rollback);

2. The committer performs any work required for the commit (e.g. rewinding the get cursor); and 3. The committer informs the lockmanager the commit is complete (and the lock manager releases locks on all the messages).

The lockmanager pauses any requests that reference affected messages after it is informed in step 1 until step 3 is complete, as far as the rest of the system is concerned the whole commit appears atomic and only affects applications that try and access messages in a committing transaction rather than the entire queue(s).

Another optimization is possible in implementations that can change multiple states apparently simultaneously (e.g. with a lockmanager). In the above descriptions of committing a put (or rolling back a get), the getCursor potentially needed to be rewound for every message in the transaction. Once the commit appears atomic, only one potential rewind is necessary per queue involved in a transaction (as opposed to every message in the transaction). The cursor is rewound to the earliest message (by orderId) in each queue during step 2 and that is sufficient to ensure message ordering.

The disclosure tries to efficiently implement a queue that is not strictly FIFO, messages can be put to the queue (potentially) in batches and then committed (unlocked). Whilst the messages are locked, other (unlocked) messages put after the locked messages can still be de-queued which is not possible in a strictly FIFO queue.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

Improvements and modifications can be made to the foregoing without departing from the scope of the present invention.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

The invention claimed is:
1. A method for transactional capable queuing, comprising:
   providing a queue having an ordered list of messages;
   providing a get cursor operation within the queue to point to a current starting place for a getting application to start searching for a message to retrieve;
   providing a first lock for putting operations, in response to there being more than one putting application, to ensure only one application is putting to the queue at a time;

providing a second lock for getting operations, in response to there being more than one getting application, to ensure that only one application is getting from the queue at a time; and synchronizing between putting applications and getting applications to check and update the get cursor operation.

2. The method of claim 1, further comprising:
a putting application using an instruction to rewind the cursor in response to the putting application committing a message earlier than a current position of the cursor.

3. The method of claim 1, further comprising:
a getting application using an instruction to move the cursor forward.

4. The method of claim 1, wherein the get cursor operation consists of one or two memory words used by an atomic instruction for the synchronizing.

5. The method of claim 1, wherein the queue is a singly-linked list and the ordered list of messages is provided by numbering each message on the queue.

6. The method of claim 1, wherein the get cursor operation uses:
a pointer to a message on the queue where a search should start; and
an order number of the message on the queue.

7. The method of claim 6, wherein the synchronizing uses a Double Width Compare and Swap (DWCAS) operation and the get cursor operation consists of two memory words for the pointer to the message on the queue and the order number of the message on the queue.

8. The method of claim 1, wherein the queue is a data structure with an index acting as both pointer and order number; and
the get cursor operation points to the index of the data structure.

9. The method of claim 8, wherein the synchronizing uses a Compare and Swap (CAS) operation and the get cursor operation consists of one memory word for the index.

10. The method of claim 1, wherein the synchronizing uses a lock on the get cursor operation.

11. The method of claim 1, further comprising:
responsive to there being a single putting application, no first lock is provided;
responsive to there being a single getting application, no second lock is provided; and
the synchronizing is around the get cursor operation.

12. The method of claim 1, further comprising:
providing a dummy message to prevent an empty queue.

13. The method of claim 1, further comprising:
providing a maximum order number to indicate that no valid message exists for a getting application to retrieve and a new put sets the cursor to point to it.

14. The method of claim 1, wherein the first lock and the second lock a message for every queue involved in a transaction for a duration of a commit or rollback.

15. The method of claim 1, wherein the first lock and the second lock are provided by flags set in a message to indicate that the message is available or is part of a transaction.

16. The method of claim 1, wherein the first lock and the second lock are provided by a lock manager maintaining a list of messages locked on behalf of a transaction.

17. A data processing system for transactional capable queuing, comprising:
a bus system;
a memory coupled to the bus system, wherein the memory stores program code;
a processor coupled to the bus system, wherein the processor executes the program code;
a queue having an ordered list of messages;
a get cursor component for operation within the queue to point to a current starting place for a getting application to start searching for a message to retrieve;
a first lock for putting operations, in response to there being more than one putting application, to ensure only one application is putting to the queue at a time;
a second lock for getting operations, in response to there being more than one getting application, to ensure that only one application is getting from the queue at a time; and
a synchronizer mechanism for synchronizing between putting applications and getting applications to check and update a get cursor operation.

18. The data processing system as claimed in claim 17, further comprising:
a putting application including an instruction to rewind the cursor in response to the putting application committing a message earlier than a current position of the cursor.

19. The data processing system of claim 17, further comprising:
a getting application including an instruction to move the cursor forward.

20. A computer program product for transaction capable queuing, the computer program product comprising: a computer readable storage medium readable by a processing circuit and storing instructions for execution by the processing circuit for performing a method of:
providing a queue having an ordered list of messages;
providing a get cursor operation within the queue to point to a current starting place for a getting application to start searching for a message to retrieve;
providing a first lock for putting operations, in response to there being more than one putting application, to ensure only one application is putting to the queue at a time;
providing a second lock for getting operations, in response to there being more than one getting application, to ensure that only one application is getting from the queue at a time; and
synchronizing between putting applications and getting applications to check and update the get cursor operation.

* * * * *